United States Patent
Ort

[15] 3,645,040
[45] Feb. 29, 1972

[54] UNBALANCED CULTURE METHOD OF ALGAE PRODUCTION

[72] Inventor: Jay E. Ort, Lubbock, Tex.
[73] Assignee: ERA Incorporated, Clovis, N. Mex.
[22] Filed: July 16, 1970
[21] Appl. No.: 55,570

Related U.S. Application Data

[63] Continuation-in-part of Ser. No. 676,195, Oct. 18, 1967, Pat. No. 3,521,400.

[52] U.S. Cl............................................................47/1.4
[51] Int. Cl.............................................................C02c 1/00

[58] Field of Search...................................................47/1.4

[56] References Cited

UNITED STATES PATENTS

| 3,431,200 | 3/1969 | Davis et al. | 210/10 |
| 3,521,400 | 7/1970 | Ort | 47/1.4 |

*Primary Examiner*—Robert E. Bagwill
*Attorney*—Irwin Morton Aisenberg

[57] ABSTRACT

Interruption of algal-bacterial symbiosis by high-intensity light permits increased algae production.

5 Claims, X Drawing Figure
No

UNBALANCED CULTURE METHOD OF ALGAE PRODUCTION

RELATED APPLICATION

This application is a continuation-in-part of application, Ser. No. 676,195, filed Oct. 18, 1967, corresponding to U.S. Pat. No. 3,521,400.

This invention relates to the production of algae for feedstuffs. More particularly, the invention is concerned with efficient separation of algae from symbiotic cultures. As a byproduct waste water is made reusable. The import of this is seen from the United States Department of the Interior publication, "New Water For Old," WP-19, Government Printing Office, 1966.

Considerable research has been conducted for separating suspended algae from water. This is reflected, e.g., in U.S. Pat. No. 2,867,945. Commonly employed methods include: chemical flocculation, flotation, filtration, and centrifugation. This new method uses a biochemical flocculation process.

One object of this invention is to provide a highly efficient means of separating algae from water.

Another object is to produce an algae feedstuff which is relatively free from residual chemicals or minerals.

Another object is to produce a high quality reclaimed water suitable for industrial or other use.

A further object is to produce softened water.

An additional object is to effect a feasible means of water pollution control.

Other objects, together with the foregoing, are attained in the process herein described.

This invention contemplates employment in large-scale production of algae for feeding operations, particularly as a major protein source and to a lesser extent a source of fats, carbohydrates, vitamins and minerals.

In practice algae, primarily chlorella, e.g., *Chlorella pyrenoidosa*, scenedesmus, e.g., *Scenedesmus obliquus*, and euglena, e.g., *Euglena pracilis*, are grown on sewage, which may be supplemented by agricultural fertilizers and carbon dioxide derived from the combustion of fuel used, e.g., for drying separated algae.

The invention employs certain facets of two well-known processes. The first of these is a phenomenon described by Oswald and Goleuke as autoflocculation. This process has no doubt been in operation for over half a billion years. The second is the lime-soda softening process which has been in use for perhaps 50 to 100 years. The heart of one facet of the invention lies in the means of triggering autoflocculation and, in so doing, producing a very efficient variation of the lime-soda process. For uniform control, irrespective of weather or climate, artificial means is ordinarily required, but certain dry climates which have extended daily periods of intensive sunlight, such as the climate prevailing in Lubbock, Texas, make it possible to use this intensive sunlight for triggering the autoflocculation.

Natural sunlight may be used in many areas of the world, but warm desert regions are most conducive to efficient use because of the high percentage of available sunlight and relatively warm winters. The most important climatological factors are (1) percentage of available sunshine and (2) average winter air temperature. Other important factors are (1) the bicarbonate alkalinity of the water and the magnesium content of the water. There are no exact specifications of sunlight percentage but generally speaking, upwards of 67 percent is advisable. Wintertime light intensity between 40° N. latitude and 40° S. latitude is adequate except with cloud cover. The higher the percentage of sunshine the more favorable operating economics become, because of decreased requirements in artificial ultraviolet light or upon lime to adjust pH upward. Higher average temperatures in winter mean faster metabolic rates in the algae and more rapid shifting of the chemical equilibrium of the pond. A climate wherein few winter days average under 32° F. air temperature is advisable. Harsher climates could be properly dealt with in affecting autoflocculation by covering or partially covering the decarbonation pond area with a transparent cover to conserve energy. Transparent fiberglass panels or transparent plastic film may be used for this purpose. With such covering, only percentage of sunlight remains a critical climatological factor. Chemical factors are covered later.

Autoflocculation occurs when a culture of sewage-grown algae is actively photosynthesizing in a shallow, i.e., 4 to 5 inches deep, culture. After some time under these conditions the algae flocculate by themselves. Accompanying the flocculation are changes in pH, temperature and hardness. This phenomenon has been attributed to precipitation of hardness resulting from a rise in temperature and pH. More basically, the observed rise in pH is primarily brought about by the effect of the bactericidal ultraviolet wavelengths in the sunlight. The bactericidal range runs from 2,200 to 3,000 Angstroms, with a 2,600 Angstrom optimum. The minimum solar wavelength at ground level is about 2,920 Angstroms, but high intensity makes sunlight fairly effective as a germicide on bright days. Maximum effective penetration of the solar ultraviolet is several inches in an algal culture. With bacterial action substantially arrested, a symbiotic unbalance develops. Consequently, the production of carbon dioxide drops sharply and residual carbon dioxide is quickly assimilated by the algae. Uptake of the carbon dioxide produces a shift in the equilibrium equation indicated below:

(1) 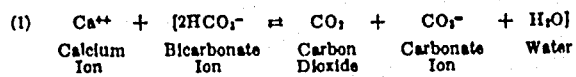

$$Ca^{++} + [2HCO_3^-] \rightleftharpoons CO_2 + CO_3^{--} + H_2O$$
Calcium  Bicarbonate  Carbon  Carbonate  Water
Ion  Ion  Dioxide  Ion With carbon dioxide removal two things happen. First, the carbonate maintains equilibrium with bicarbonate and hydroxyl ions:

(2) 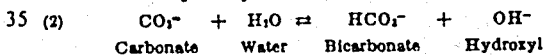

$$CO_3^{--} + H_2O \rightleftharpoons HCO_3^- + OH^-$$
Carbonate  Water  Bicarbonate  Hydroxyl The algae now have the bicarbonate as a primary source of carbon dioxide. An increase in carbonate ion results in increased hydroxyl ion concentration and a rise in pH. When sufficient calcium ions are present, precipitation of calcium carbonate occurs. Precipitation usually occurs between a pH of 9.7 and 10.0.

If the pH exceeds a level of 10.0, magnesium precipitation may occur as indicated:

(3) 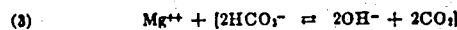

$$Mg^{++} + [2HCO_3^-] \rightleftharpoons 2OH^- + 2CO_2$$

The precipitating hardness acts as centers or nuclei upon which algae agglomerate and settle.

The lime-soda process employs lime to remove carbon dioxide and carbonate hardness and soda ash to remove noncarbonate hardness. The process may be manipulated with close control to remove calcium hardness only. In terms of dosage required, the process chemical data are:

| Chemical Removed | Pounds Chemical Added per million gallons for each mg./l. of chemical removed | Chemical Added |
| --- | --- | --- |
| Carbon dioxide | 14.0 | Hydrated lime |
| Magnesium | 25.4 | Hydrated lime |
| Bicarbonate alkalinity | 6.2 | Hydrated lime |
| Noncarbonate hardness | 8.84 | Soda ash |

In practice, this softening process requires large amounts of lime and soda ash for waters of high hardness. By combining this process with autoflocculation, it is possible to allow an unbalanced culture to approach precipitation, then use lime-soda in much smaller amounts to complete the job. The reason for using lime-soda to culminate precipitation is simply control; precipitation occurs in the flocculation chamber, not in pond. Selective calcium softening is normally desirable for two reasons: (1) The extra lime required may not be justified if the magnesium hydroxide precipitate does not appreciably improve flocculation. (2) Excessive magnesium hydroxide in the algae extracted could produce cathardic affects in a feeding operation.

As previously mentioned, the heart of this invention lies in the means for triggering the autoflocculation, generally (but not necessarily) without the benefit of strong sunlight. Disrupting the symbiotic balance may be accomplished in a number of ways, but the use of a bactericidal ultraviolet lamp is ordinarily best. Exposure of a symbiotic culture to 2,537 Angstrom light of high intensity for a short time, e.g., 1 to 5 minutes, selectively inhibits bacterial action without appreciably affecting the algae.

Chlorine disinfection may also be used, but the residual character of chlorine is detrimental to algae also. Use of ozone disinfection is an alternative to ultraviolet in desirability.

After disinfection, the culture is directed into a shallow pond (12 inches or less in depth). Here, under sunlight, decarbonation occurs and precipitation is approached or even attained in summertime. This primed culture is then pumped into a flocculation chamber where sufficient lime-soda is added to culminate precipitation.

Lime and soda requirements are precisely computed from the analyses of water leaving the decarbonation pond according to the preceding table. The requirements for any given installation vary with seasonal changes, i.e., more chemical dosage is required in cooler weather because of lower temperature (reduced algal activity) and less light to drive the photosynthesis reaction. Transition is gradual. Each facility or installation has a particular correlation of pH to alkalinity and carbon dioxide for the local waste water. Magnesium and noncarbonate hardness are essentially constant for a given locality. Once these determinations and pH correlation are established, dosage may be satisfactorily controlled on the basis of pH alone. Periodic checks on correlation are desirable, on perhaps a monthly basis. As an alternative, the flow from the decarbonation pond may be continuously monitored for all four items of said table, using commercially available sensing and recording equipment.

The settled algae floc is pumped through a recarbonation chamber where carbon dioxide from the heating unit of the algae dryer is used. The recarbonation puts precipitated hardness back into solution. The recarbonated floc then goes through a continuous centrifuge where further dewatering produces an algae slurry and a bicarbonate-rich water. The slurry is relatively free of excess minerals. The bicarbonate water may be partially recycled in areas where hardness and alkalinity of waters are low.

Hardness and alkalinity of waters involved in the process are of vital importance. In a water of low alkalinity, precipitation may be brought about fairly quickly, but because of the small number of nuclei formed, flocculation cannot be very effective. In waters of high alkalinity, the buffering capacity of the bicarbonate makes the time required in effecting precipitation much longer in comparison to low alkalinity waters. Density of the culture, of course, has an important bearing on the time required. A high density culture can more quickly deplete the bicarbonate buffer than a sparse culture. The ideal situation involves a high density culture with a high-calcium level and relatively low alkalinity. From equations (1) and (2) it can be seen that the equilibrium problem requires a compromise on alkalinity and calcium.

Raw sewage from a city is fed into a detection pond which is a nondescript pond of a nominal 16 to 24-hour capacity. The primary function of this pond is flow control, which can be effected, e.g., by a calibrated variable weir. The secondary function of the pond is sedimentation; seeding of the waste water with recycled culture may also be accomplished in this pond (optional).

From the detention pond the settled sewage is transferred to a series of five growth cells. Within the Growth Unit incoming raw sewage is decomposed and made available to algae (as carbon dioxide ammonia, etc.) by bacterial action. The density of algae growth increases greatly as the waste water preceeds through the unit. Cells one and two, separated by a five-foot high concrete wall, have a capacity for about one day's flow each, including recycled seed. They are fully and continually aerated by cage rotor aerators, at about 6-horsepower per million gallons. The aerators maintain circulation to minimize dead spots in addition to oxygenating the water. The operating depth is from 42 to 54 inches. In these cells, aeration and recycling from cell five promote rapid development of a bacterial population. The bacterial activity assures an abundance of nutrient available for algae growth. Cells three, four and five are primarily intended to produce a dense algae growth. Stirring and aerating of the culture are produced by slowly bubbling air from perforated lines on the cell bottom. The mixing tends to keep algae from settling, minimizes dead spots and provides needed oxygen during early morning hours. Air comes from a high volume compressor. In cold weather, hot carbon dioxide-rich air from the drying operation may be used. Agricultural fertilizers may also be added to supplement the sewage. The rolling motion produced by the bubbling also allows for more efficient use of light. The capacity of each cell is approximately one day's flow, and the operating depth is from 32 to 36 inches. The cells are interconnected. Approximately 10 percent by volume of cell five is recycled to the detention pond for seed.

When strong sunlight is the means employed for triggering the autoflocculation, several of the units employed can actually be combined. Thus, e.g., cells one and two of the growth unit can be incorporated in the detention pond, which covers from, e.g., 4 to 6 acres, has a depth, e.g., from 36 to 60 inches, depending on weather conditions, and has a capacity of from four to six times the daily throughput. No aeration need be used.

Likewise, cells three, four and five are combinable into a single pond (pond 2) covering, e.g., 6 to 9 acres and having a capacity of about twice the daily throughput. As when operating with artificial autoflocculation, it is preferred to have recirculation the upstream the downstream portion of pond 2 to the upstream portion of the combined detention pond. Pond 2 is, preferably, about 12 inches deep when strong sunlight is relied upon for triggering the autoflocculation.

From cell five the culture enters the initial step of flocculation in the disinfector where the effluent from cell five flows under a bank of ultraviolet lights at a depth of 2 to 3 inches. Normally a channel area of about 1,000 square feet (length: width relationship is suitably 2 to 3 : 3 to 2, preferably 2 to 3 : 3) and about 2,000 watts of fluorescent lamp power are required per million gallons of flow. The lamps, e.g., a 64-inch General Electric Germicidal Fluorescent 65 watt tube each irradiating an area 8½ by 4 feet, are suspended 8 to 12 inches above the culture surface. This disinfector is selectively effective in retarding bacterial action without affecting algal metabolism. Calculations for any given culture may be performed according to "Water Supply and Pollution Control" by Clark and Viessman, Pages 476–479. Eighty-five percent disinfection is adequate and may be accomplished as described. Disinfection may also be accomplished by chlorination, ozonation, radiation or other means as outlined in Clark and Viessman, Pages 463 through 488. By disrupting bacterial action, carbon dioxide production is greatly reduced and an unbalanced culture is rapidly achieved.

When autoflocculation is initiated and effected without artificial means, the disinfector can be eliminated altogether. The culture from the second pond (combined cells three, four and five) can be conducted directly into the decarbonation pond which, under these conditions, need have no agitation, can cover, e.g., from one to one and a half acres and have a depth of from about 4 to about 6 inches.

When artificial autoflocculation is employed, the unbalanced culture from the disinfector flows into a shallow (6 to 12 inches deep) decarbonation pond. Under strong sunlight the pH of the culture rises by the assimilation of carbon dioxide by the algae and the shift in the equilibrium of equation (1), according to equations (2) and (3). During midsummer a pH of 10.0 may be achieved in 5 hours or less at an operating depth of 6 to 8 inches. In midwinter an exposure for 9 hours may not be ample to produce a pH of 10.0. In order to alleviate the problem of algae settling in the decarbonation pond in summer operations, two alternatives are employed. First, by simply operating the decarbonation pond at a greater depth (10 to 12 inches), flocculation in the pond can be avoided or delayed. Second, stirring equipment may be installed, and flocculation be allowed to occur. This agitation keeps the floc material suspended and eliminates the need for any lime dosage in the flocculation chamber during summer operations. Equipment suitable for stirring has been assembled by using brushes, such as those employed with street sweeping machines. Such brushes, mounted horizontally and driven by an electrical motor at a speed of 5 to 10 r.p.m. do very well. Typically, a total axial length of 40 feet of brushes per million gallons per day capacity is adequate. Properly geared, a drive power of 5 to 6 horsepower will carry this load.

After the sun has gone down and photosynthesis is no longer in operation, the pH of the unbalanced culture remains relatively high and stable.

The relative stability and high level of pH in the unbalanced culture allows the process to be operated on a continuous 24 hour basis. Only in the early morning hours does the pH of the unbalanced culture sag. This results from endogenous respiration of the algae and is especially pronounced after dissolved oxygen in the culture is depleted. Even this sag may be eliminated by the use of artificial illumination. Use of daylight type fluorescent lamps with a surface intensity of 50 to 100 lumens on a 6 inch-deep culture (300 mg./l culture density) from midnight through 6 AM is adequate. For a culture of 12 inches depth illumination must be increased by a factor of 4. Light requirements vary with culture density similarly (i.e., with the square of the density of depth).

The culture flows from the decarbonation pond into the flocculation chamber continuously. Based upon analysis of carbon dioxide, bicarbonate alkalinity, magnesium and noncarbonate hardness of culture leaving the decarbonation pond, lime and soda ash are fed into the culture in the flocculation chamber. Capacity of the flocculation chamber should be adequate for a flow of 0.5 GPM per square foot of surface area.

Using the settling hardness crystals as nuclei, the algae agglomerate and settle at the bottom of the chamber. [A contact sludge type softener such as a "Permutit Precipitator" makes a very efficient flocculation chamber.] Water overflowing from the flocculation chamber is directed to a 5-day, 5-foot deep polishing pond (or lagoon) from which it can be reclaimed for industrial use. Alternatively, it can be fertilized and used to grow a second algae crop. The residual nutrient content of the water dictates the amount of agricultural fertilizer required and, thus, the economic advisability of this option.

In order to remove excessive mineral ash (especially magnesium, but also calcium), waste carbon dioxide from the dryer is bubbled through the flocculated algae just prior to centrifuging. Introduction of the carbon dioxide puts the precipitated mineral back into solution. Carbon dioxide is derived from the combustion of fuel for drying. The carbonator (or recarbonator) is optional.

The algae floc (averaging from 1.5 to 2.5 percent solids) is pumped to a continuous solid bowl (scroll type) centrifuge. Such centrifuges are commercially available. The discharge from the centrifuge comprises a slurry having from 12 to 15 percent solids and a high hardness alkaline water, which may be partially recycled in soft water areas to improve flocculation efficiency.

From the centrifuge several alternatives exist. The algae slurry may be used for feed without further drying. It may be blended for pelleting in slurry form. Also it may be blended and flaked. Drying for bulk shipment does offer several advantages. It provides a carbon dioxide source for recarbonation and hot air to improve cold weather algae production. Any of a number of commercial dryers is satisfactory.

Centrifuge slurry may be fed into a boiler and cooked for, e.g., 30 minutes at from 95° to 100° C. The thus cooked algae meal is dried to 8 to 10 percent moisture in a double drum atmospheric dryer. The product from the dryer is temporarily stored in a bin awaiting transfer to a storage silo or hopper.

If livestock pens are operated adjacent the algae culture, runoff and wastes may be directed to the growth cells and greatly increase nutrient availability. Should the livestock operation be sufficiently large, a second crop operation will be mandatory to achieve a reasonably high quality effluent.

The algae produced amounts to upwards of 1.5 tons per million gallons of domestic waste processed. The primary value of the algae is as a protein source for feeding of cattle, sheep, swine and poultry. The algae also contain significant amounts of phosphorus, calcium potassium, carotene and other vitamins and minerals. The water produced, with ordinary sand filtration and disinfection, is superior to the original municipal supply water in many areas of the country. This is because of the softening and partial demineralization accomplished as a byproduct of the process. Final hardness will run 2 to 3 grains. Biochemical oxygen demand (BOD) of effluent water normally runs 2 to 5 milligrams per liter.

In the entire cycle described, the essence of the invention lies in the disinfection, decarbonization and flocculation. The disinfector is ordinarily either square or rectangular. If 64-inch General Electric Germicidal Fluorescent 65 watt tubes are employed, it is convenient to place them in the same plane in parallel columns 4 feet apart and removed vertically 3 feet from the closest tubes in the same column. Thirty-one lamps cover slightly over 100 square feet with 2,000 watts. The disinfector operates 24 hours per day when artificial disinfection is employed. The dimensions of the disinfector are such that the flow therethrough takes from 1 to 5 minutes.

Such a disinfector covering an area of 3,000 square feet (per million gallons per day) and having an ultraviolet intensity of 5 kilowatts (per million gallons per day) produces about 95 percent disinfection. However, 85 percent disinfection is satisfactory, and this is produced by an area of 1,000 square feet (per million gallons per day) and an ultraviolet intensity of only 2 kilowatts (per million gallons per day).

In the absence of artificial disinfection the culture may be placed in the decarbonation pond and natural sunlight is used to produce an imbalance and equilibrium shift. Approximately 4 hours in the decarbonation pond during a clear day at latitude 32° N. even in Jan. is adequate to produce that imbalance and chemical shift. Total insolation under the above conditions is approximately 150 kilocalories per acre or nearly 25 million BTU's of energy.

The decarbonation pond covers an area of 3 acres per million gallons per day. The normal operating depth is 12 inches. During summer months the pH may exceed 10.0 in late afternoon and precipitation may occur before the culture leaves the decarbonation area. To keep the algae suspended, air from a high-volume compressor is fed through perforated plastic lines. A 3.5 horsepower 40 cubic feet/minute compressor (per million gallons per day) is used to deliver air at 5 p.s.i.g. through ¾ inch lines. The lines are laid traversely, 20 feet apart in the final one-third of the pond area. Operation of the compressor is effected in summer only. Because of the irreversibility of the upward trend in pH imposed by disinfection, the culture is continuously fed from the decarbonation pond into the flocculator. Culture leaving the decarbonation pond ranges from as high as 11.0 in pH to as low as about 0.9, depending largely upon the season of the year. The culture is normally maintained in the decarbonation pond for 24 hours.

A small percentage of ordinary sunlight is in the bactericidal ultraviolet range, but because of the relatively high intensity of sunlight that small percentage is significant. By subjecting a very shallow culture (4–6 inches) to natural sunlight in the decarbonation pond, the symbiotic balance can be upset without the use of artificial ultraviolet. Approximately 4 hours such exposure, even in winter (on clear days) is adequate to produce the imbalance and chemical shift.

The flocculator simply consists of a "Permutit Precipitator" of appropriate size, operated as a cold lime softner. Because of the relatively low density of the algae-hardness agglomerate formed, the unit is operated at about 0.6 gallons per minute per square foot of surface area (compared to a 2.0 to 3.0 gallons per minute per square foot of surface area rate for ordinary softening). This amounts to about 1,160 square feet per million gallons per day.

In this process disinfection is employed to upset symbiotic balance and to assist in producing a rise in pH to approach the precipitation-flocculation point. The use of disinfection to render the rise in pH irreversible allows flocculation on a 24-hour/day basis. Without disinfection a normal balanced culture pH may rise to about 10.0 in daylight and fall to 8.0 or lower at night. Disinfection precludes the downward shift at night, permitting continuous harvesting.

With no artificial disinfection, but using sunlight in a very shallow (4-6 inches) decarbonation pond a pH level of approximately 11.0 is possible. This high pH level tends to retard bacterial recovery during much of the period of darkness. This allows algal harvesting to be carried on 4 to 6 hours after sundown. This means that this mode of operation allows at least 12 hours per day harvesting even in winter. After 4 to 6 hours of darkness the bacterial population slowly recovers and pH level drops to levels that are not so economically attractive to harvesting costs.

Combining disinfection with lime treatment to soften the water and to flocculate the algae, yields an even more advantageous result.

EXAMPLE 1

Flow: one million gallons per day.
1. Detention Pond—Capacity approximately 1 million gallons nominally 5 to 8 feet deep, equipped with variable weir outlet. In this pond sewage flow from the city is received. Culture from cell five is recycled into this pond for seed. Normally 10 percent of flow is recycled.
2. Growth Unit—(5 cells or ponds)
   A. Cells one and two—Capacity approximately 1 million gallons each. Operating depth—42 inches—approximately 0.9 acre each. Aerated continuously by a 6 foot cage rotor aerator driven by a 6 HP motor. Cells consist of earthen walled pond partitioned by concrete dikes.
   B. Cells three, four and five—Capacity 1 million gallons each, approximately one acre plus area with an operating depth of 32 inches. Air (optionally enriched with carbon dioxide and ammonia) is slowly bubbled through culture in these cells through perforated lines in the pond bottom. A 30 CFM compressor driven by a 2 HP motor supplies air. Ten percent of cell five culture is recycled to the detention pond.
3. Disinfector—Culture from cell five flows at 2 inches depth over a 1,000 square feet concrete channel. Thirty-one 65 watt germicidal fluorescent lamps are suspended 8 inches above the channel (evenly distributed).
4. Decarbonation Pond—Total area 4 acres. Average operating depth 10 (may vary from 6 to 12) inches. Normally full 4 acres is used only with 6 to 8 inch winter operating depth. Summertime 12 inch depth requires only about 2 acres. 40 feet of brush agitators driven by 5 HP motor allows shallow summer operation to be used. Typical analysis of decarbonation pond:

| Item | Analysis | Dosage (per day) |
|---|---|---|
| Carbon Dioxide | 0.0 mg./l. | 0 lb. Lime |
| Bicarbonate Alkalinity | 20.0 mg./l. | 124 lb. Lime |
| Magnesium | 10.0 mg./l. | 254 lb. Lime |
| Noncarbonate Hardness | 10.0 mg./l. | 265.2 lb. Soda |

5. Flocculator—"Permutit Precipitator"—of 1400 square feet area (0.5 gallons per minute per square foot). Chemical dosage is determined as indicated in the above table. (Slightly over-designed for high-flow tolerance.)
6. Centrifuge—Dorr Oliver—Mercobowl Z-3L (or equivalent) "Floc" from the "precipitator" averages 1.5 to 2.0 percent solids. At the required throughput for 24 hours per day centrifuging, a final product of 20 percent solids is achieved. The centrifuge is operated at 66 g.p.m. (6 hrs/day) with 8 percent solids is discharge.
7. Drying—Using a drum dryer (General Food Products Equipment's G. D. 220), an 8 to 10 percent moisture final algae product is produced.

EXAMPLE 2

Flow: one million gallons per day.
Location: Lubbock, Texas
1. Combined Detention Pond and Growth Unit A—Capacity of from four to 6 million gallons, covering from 4 to 6 acres at a nominal depth of from 36 to 60 inches. At the upstream end of this pond city sewage flow and, preferably, recycle (for seed) from the downstream end of Pond 2 are received. Normally 10 percent of the flow is recycled.
2. Pond 2—Capacity two million gallons, covering from 6 to 9 acres at a nominal depth of about 12 inches. Ten percent of the downstream culture is recycled to the detention pond inlet.
3. Decarbonation Pond—Total area one to one and one half acres. Average operating depth 5 (may vary from 4 to 6) inches. No agitators. Typical analysis of decarbonation pond:

| Item | Analysis | Dosage (per day) |
|---|---|---|
| Carbon Dioxide | 0.0 mg./l. | 0 lb. Lime |
| Bicarbonate Alkalinity | 20.0 mg./l. | 124 lb. Lime |
| Magnesium | 30.0 mg./l. | 762 lb. Lime |
| Noncarbonate Hardness | 0.0 mg./l. | 0 lb. Soda |

4. Flocculator—"Permutit Precipitator"—of 1,400 square feet area (0.5 gallons per minute per square foot). Chemical dosage is determined as indicated in the above table. (Slightly over-designed for high-flow tolerance.)
5. Centrifuge—Dorr Oliver—Mercobowl Z-3L (or equivalent) "Floc" from the "precipitator" averages 1.5 to 2.0 percent solids. At the required throughput for 24 hours per day centrifuging, a final product of 20 percent solids is achieved. The centrifuge is operated at 66 g.p.m. (6 hrs/day) with 8 percent solids in discharge.
6. Drying—Using a drum dryer (General Food Products Equipment's G. D. 220), an 8 to 10 percent moisture final algae product is produced.

The preceding examples are merely illustrative and are in no way limitative. The invention is restricted only by express limitations in the claims.

What is claimed is:
1. In a process for synthetic conversion of organic waste which comprises culturing both algae and bacteria on the organic waste in symbiosis and subsequently harvesting the thus-cultured algae, the harvesting including any material flocculation or separation, the improvement comprising effecting bacterial disinfection with sunlight prior to said harvesting, the sunlight being of sufficient duration and intensity to reduce the relative concentration of bacteria substantially without materially affecting the algae concentration, whereby an imbalance occurs and the symbiosis is disrupted.

2. A process according to claim 1 wherein the algae are selected from the group consisting of Chlorella Scenedesmus and Euglena.

3. A process according to claim 2 comprising decarbonating resulting unbalanced culture and flocculating thus-primed culture with lime.

4. A process according to claim 3 wherein decarbonation is effected in a shallow pond by bright sunlight.

5. A process according to claim 1 wherein the bacterial disinfection comprises at least 85 percent coliform reduction.

* * * * *